United States Patent [19]

Bradford

[11] Patent Number: 5,597,113
[45] Date of Patent: Jan. 28, 1997

[54] RECYCLABLE CONTAINER PARTITION

[75] Inventor: Judson A. Bradford, Holland, Mich.

[73] Assignee: Bradford Company, Holland, Mich.

[21] Appl. No.: 559,619

[22] Filed: Nov. 20, 1995

[51] Int. Cl.[6] .................................................. B65D 5/499
[52] U.S. Cl. .............................. 229/120.36; 229/120.07; 229/120.38; 493/91; 493/114; 493/912
[58] Field of Search ......................... 229/120.07, 120.36, 229/120.38; 217/30–33; 493/90, 91, 114, 115, 912; 220/552

[56] References Cited

U.S. PATENT DOCUMENTS

| | | | |
|---|---|---|---|
| 1,912,505 | 6/1933 | Weston | 220/552 |
| 2,145,106 | 1/1939 | Anderson | 220/552 |
| 2,549,801 | 4/1951 | George . | |
| 2,842,279 | 7/1958 | Gustafson | 217/31 |
| 3,067,903 | 12/1962 | Jones, Jr. | 220/552 |
| 3,253,763 | 5/1966 | Henderson . | |
| 3,383,027 | 5/1968 | Brinkama et al. | 229/120.07 |
| 3,580,471 | 5/1971 | Burke et al. . | |
| 3,640,445 | 2/1972 | Durham | 217/30 |
| 3,843,039 | 10/1974 | Brown et al. . | |
| 3,942,709 | 3/1976 | Gepfer . | |
| 4,226,357 | 10/1980 | Martin . | |
| 4,621,764 | 11/1986 | Ragon . | |
| 4,746,053 | 5/1988 | Nichols . | |
| 4,776,481 | 10/1988 | Kidd | 217/33 |

FOREIGN PATENT DOCUMENTS

| | | | |
|---|---|---|---|
| 2424873 | 12/1975 | Germany | 229/120.36 |
| 1066615 | 4/1967 | United Kingdom | 229/120.07 |

*Primary Examiner*—Gary E. Elkins
*Attorney, Agent, or Firm*—Wood, Herron & Evans, P.L.L.

[57] ABSTRACT

A collapsible partition assembly comprising a set of parallel longitudinal dividers and a set of parallel transverse dividers intersecting at a plurality of intersections. Each of the longitudinal dividers has a series of evenly spaced slots which extend downwardly from a top edge of the longitudinal divider to approximately the middle of the longitudinal divider. Each transverse divider has a series of evenly spaced slots, each slot extending upwardly from a bottom edge of the transverse divider to approximately the middle of the transverse divider. The slots of the longitudinal and transverse dividers engage with one another at the intersections. Dividers are secured to each other at each intersection by a securement bead which extends from a point proximate the top edge of the intersection to proximate the bottom edge of the intersection. The intersecting dividers create four angles. The securement bead runs along one angle and permits the partition assembly to be collapsed and recycled.

35 Claims, 2 Drawing Sheets 5,597,113

RECYCLABLE CONTAINER PARTITION

FIELD OF INVENTION

This invention relates to a collapsible partition assembly for dividing the space inside a container or box; more particularly to a collapsible partition assembly which is recyclable and non-disassembling.

DESCRIPTION OF THE PRIOR ART

In the storage, shipment or display of parts or merchandise, it is a common practice to divide the interior of a box or container into a plurality of individual cells. The interior of a box or container is typically separated by a series of dividers, one set of parallel dividers being orthogonal to a second set of dividers. The dividers separate the interior of the container into a plurality of individual cells each of which is intended to hold a separate item for display or shipment. The division of the interior of the box or container helps prevent the items therein from contacting one another and breaking during shipping. The division or partitioning of the container also aids in the loading and unloading of the items therein, as well as inventorying the contents of each box or container.

The dividers typically are slotted and arranged in an orthogonal relationship to divide the interior of the box or container into a desired number of cells. The dividers are slotted in a manner that enables the dividers to engage with one another at the location of the slots so that the dividers form an orthogonal grid or matrix. Typically the dividers are made of the same material as the material of the box or container, plastic or paperboard. However, the dividers may be constructed of any suitable material with sufficient rigidity to prevent the contents of the container from contacting one another and being damaged.

Disassembling partition assemblies comprise a series of individual slotted dividers which mesh together in an orthogonal grid or matrix. The assembly as a whole is generally collapsible but the individual dividers of the assembly may be removed from the assembly individually and stacked. To disassemble the array or matrix of dividers one must lift one of the slotted dividers up out of the box or container, disengaging its slots with the slots of the dividers orthogonal to it. Because the assembly is disassembling, the assembly may be stored in much less space than if the assembly were non-disassembling. A problem with this type of partition assembly though is that if one desires to re-use the assembly one has to re-engage the slots of the dividers and then place the assembly inside a box or container. Additionally, this type of partition assembly is subject to inadvertent disassembly whenever parts are removed from the cells of the partition assembly.

A more desirable partition assembly for many applications is one that is not fully disassembling with the individual dividers of the assembly affixed to each other. Such a non-disassembling assembly may be lifted as a whole out of a box without the operator worrying about the dividers separating from one another.

Several U.S. patents disclose non-disassembling, collapsible partition assemblies which separate the interior of a box or container into a plurality of cells. The collapsible divider assemblies disclosed in these patents generally have a first set of dividers extending in one direction intersecting orthogonally with a second set of dividers extending in a second direction. In many of these non-disassembling assemblies, a portion of either the longitudinal or transverse divider is cut out at each intersection and permanently affixed to the adjacent intersecting divider in order to make the assembly non-disassembling. In others of these non-disassembling assemblies, a flap added to either the longitudinal or transverse dividers is folded and permanently affixed to the intersecting divider.

One such non-disassembling partition assembly is disclosed in U.S. Pat. No. 4,621,764 wherein slotted cross strips of a collapsible partition assembly intersect and are joined to slotted longitudinal dividers. According to the disclosure of this patent, each of the cross strips has tabs cut from the center section of each cross strip adjacent the intersecting longitudinal divider, the tabs being folded into contact with and adhered to the longitudinal dividers to prevent the longitudinal dividers from separating from the cross strips.

Another non-disassembling slotted partition assembly is disclosed in U.S. Pat. No 4,746,053. In this patent there is disclosed a non-disassembling partition assembly having a plurality of longitudinal slotted dividers inter-engaging a plurality of slotted transverse dividers. Triangular shaped tabs are cut and folded from the longitudinal dividers adjacent the top of each slot of the divider. These tabs are spot welded, stapled or otherwise secured to the transverse dividers to prevent the partition assembly from ever disassembling.

U.S. Pat. No. 3,942,709 discloses a slotted partition assembly having a plurality of parallel longitudinal dividers intersecting a plurality of cross dividers or so called tying strips. The end portions of the tying strips are bent along score lines and secured to the longitudinal dividers by a glue bond so as to prevent disassembly of the assembled partition assembly.

In each of these prior art patents, the longitudinal dividers are secured to the transverse dividers at specific locations only, namely those locations in which a portion of a divider has been cut or scored and folded along a perforation. The folded portion is then spot welded, glued or otherwise secured to the adjacent intersecting partition or divider. Such attachment or securement using tabs or folded portions of the dividers glued or otherwise secured to adjacent intersecting dividers is not always secure and may result in the tearing of the tabs and hence disassembly of the matrix. This method of securing the intersecting dividers is also costly due to the cost of cutting the tabs, assembling the partitions, folding the tabs and adhering or otherwise securing the tabs and adjacent partitions.

It has therefore been one objective of the invention to provide a non-disassemblable partition assembly which is secure and may not be easily disassembled.

It has been another objective of the present invention to provide a durable, sturdy, non-disassemblable partition assembly which is less costly to produce than prior disassemblable partition assemblies.

It has been another objective of the present invention to provide a less costly, non-disassemblable collapsible partition assembly in which the partitions are made of plastic and are recyclable.

SUMMARY OF THE INVENTION

The collapsible partition assembly of the present invention which accomplishes these objectives comprises a first set of parallel slotted plastic longitudinal dividers and a second set of parallel transverse slotted plastic dividers. In the preferred embodiment, each longitudinal divider has a series of evenly spaced slots extending downwardly from the top edge of the longitudinal divider to a mid point of the longitudinal divider and each transverse divider has a series of evenly spaced slots similarly extending upwardly from the bottom edge of the transverse divider to a point midway up the transverse divider. Preferably the plastic dividers are made from either solid or corrugated polyethylene or polypropylene plastic.

Each slot of a transverse divider is engaged with a slot of a longitudinal divider at an intersection such that each intersection defines four angles, each angle being between a longitudinal divider and a transverse divider. At each intersection there is located in one angle a securement bead permanently securing the transverse divider to the longitudinal divider. In the preferred embodiment, the securement bead extends from proximate a top edge of the intersection to proximate a bottom edge of the intersection. The securement bead allows the partition assembly to collapse into a collapsed assembled position while maintaining the assembly in an assembled, adhered relation. The capability of the assembly to collapse enables the assembly to be shipped or stored in a flat condition and reused when re-erected into an orthogonal relationship. In the preferred embodiment, the securement is sufficiently flexible as to enable the plastic partition assembly to be collapsed while maintained in its assembled relationship but is also sufficiently compatible with the plastic of the partitions as to be recyclable with the plastic partitions. In the absence of this compatibility, the securement would have to be removed before the plastic partitions could be recycled which would in most instances render recycling impracticable or excessively expensive.

DESCRIPTION OF THE PREFERRED EMBODIMENT

Figure 1:
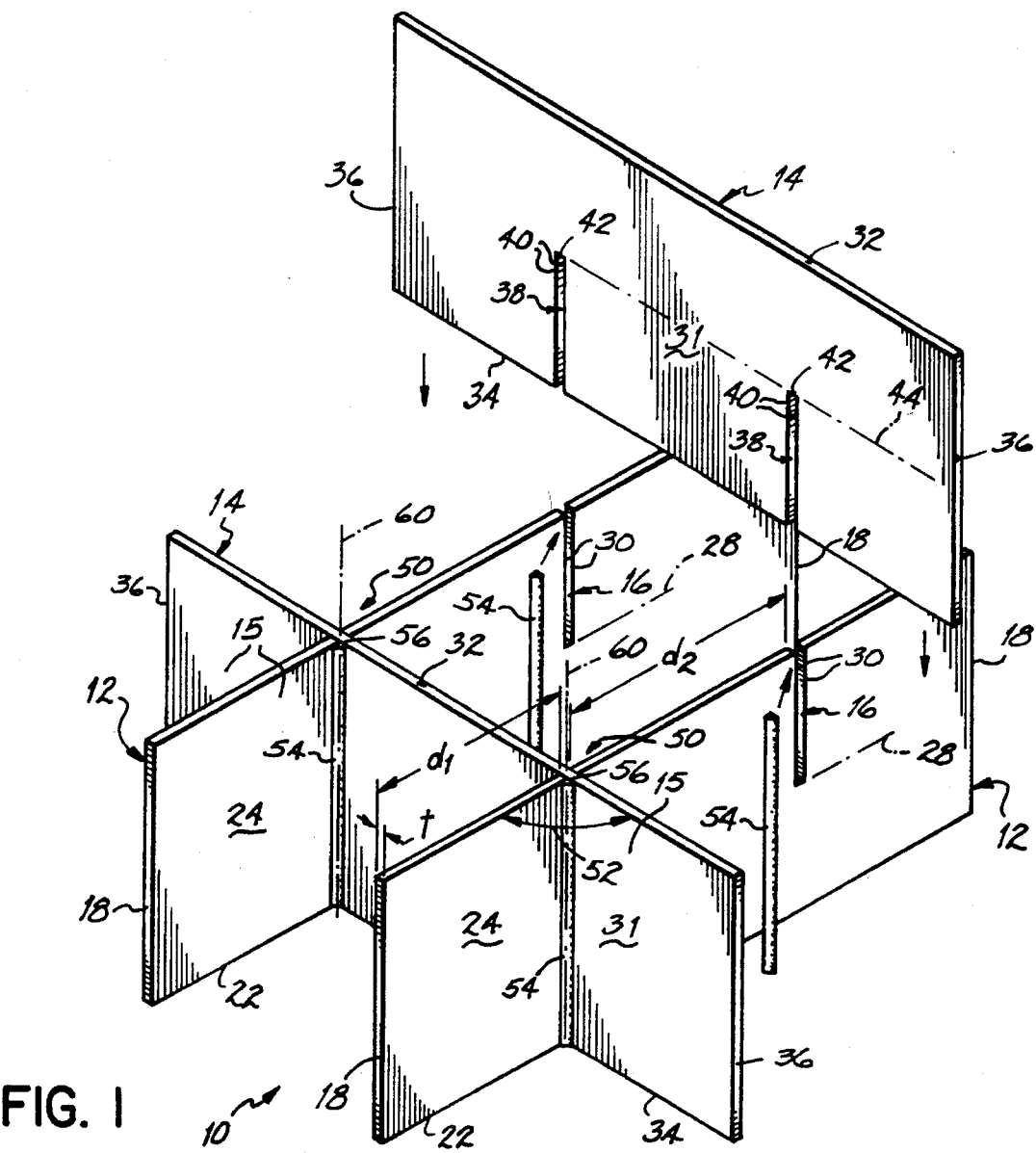
FIG. 1 is a partially exploded perspective view of the collapsible partition assembly of the present invention.
Figure 2:
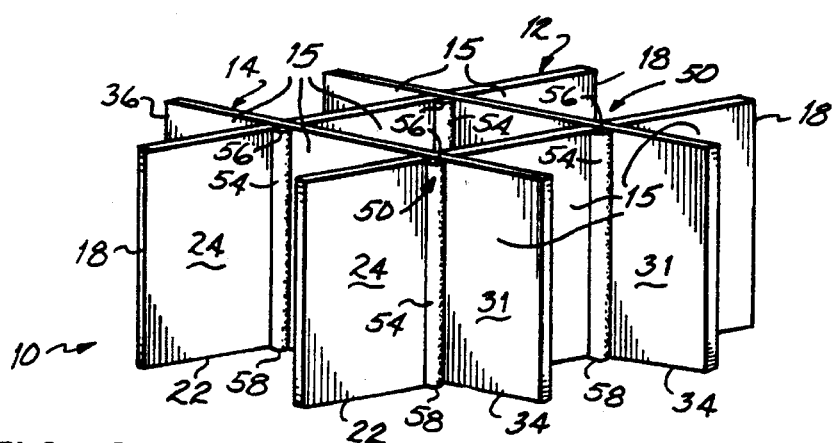
FIG. 2 is a perspective view, on a reduced scale of the assembled partition assembly of FIG. 1.
Figure 3:
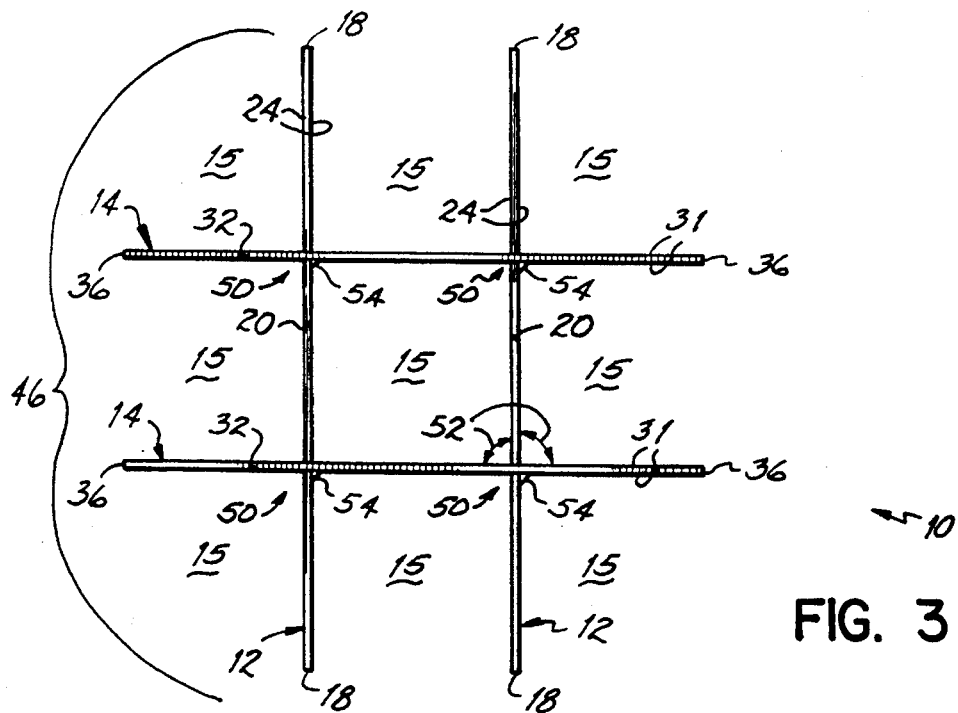
FIG. 3 is a top plan view of the collapsible partition assembly in FIG. 1 in an assembled erected position.
Figure 4:
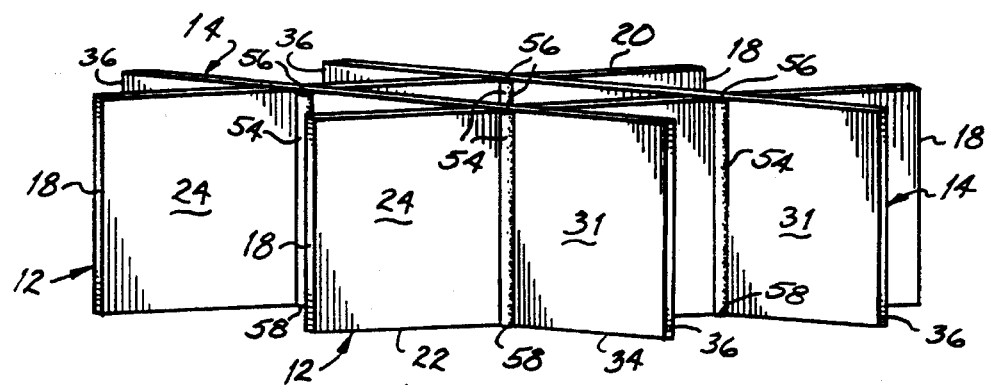
FIG. 4 is a perspective view of the partition assembly of FIG. 1 illustrating the assembly in a partially collapsed condition.

Referring to the drawings and particularly to FIG. 1 there is illustrated the collapsible partition assembly of the present invention for dividing the space inside a container. The partition assembly 10 comprises a plurality of parallel longitudinal dividers 12 intersecting a plurality of parallel transverse dividers 14. As shown in FIGS. 1, 2 and 3 the longitudinal dividers 12 and transverse dividers 14 have an intersecting orthogonal relationship when the assembly 10 is in its assembled position. The orthogonal relationship of the dividers creates a plurality of individual cells 15.

Each of the longitudinal dividers 12 has two ends 18, a top surface 20, a bottom surface 22, and two opposed side surfaces 24. The distance between the first and second side surfaces 24 defines the thickness t of the longitudinal divider 12. The thickness t is the same as the width of the top and bottom surfaces 20, 22 of the longitudinal divider 12.

Each longitudinal divider 12 has a series of slots 16 which are evenly spaced apart by a distance $d^2$ as shown in FIG. 1. In the preferred embodiment of the present invention the distance $d^2$ between slots 16 is identical to the distance $d^1$ between the end 18 of the longitudinal divider 12 and the outermost slot 16. Such uniform spacing between slots ensures cells of uniform dimension. The slots 16 extend from the top surface 20 of the longitudinal divider to a mid point 28 of the longitudinal divider 12. Each slot 16 has two sides 30, the distance therebetween forming the width of the slot 16. Each slot 16 extends downwardly to a bottom 32 which is approximately the middle or mid point 28 of the longitudinal divider 12.

Each transverse divider 14 has two ends 36, a bottom surface 34, a top surface 32 and two opposed side surfaces 31. Each transverse divider 14 has a plurality of evenly spaced apart slots 38, each slot 38 having two side surfaces 40 and an end 42. Each of the slots 38 extends from the bottom surface 34 of the transverse divider 14 upwardly to approximately the middle or mid point 44 of the transverse divider 14.

In the preferred embodiment of the invention both the longitudinal dividers 12 and the transverse dividers 14 are manufactured from either solid or corrugated plastic material such as high density polyethylene. The material from which the partitions are manufactured could though as well be other plastic material or even other solid materials. Preferably this material is die cut to the configuration illustrated in the drawings.

As illustrated in FIG. 1 the assembly is formed by placing the longitudinal dividers 12 in a spaced apart parallel manner with the slots 16 of the different longitudinal dividers 12 lined up linearly. Transverse dividers 14 are then lowered one at a time after being oriented perpendicular to the longitudinal dividers 12 such that the slots 38 of the transverse dividers 14 engage the slots 16 of longitudinal dividers 12, forming a matrix 46 of cells 15. The cells 15 divide up the interior of a box or container and prevent particles therein from breaking by banging against one another.

Figure 5:
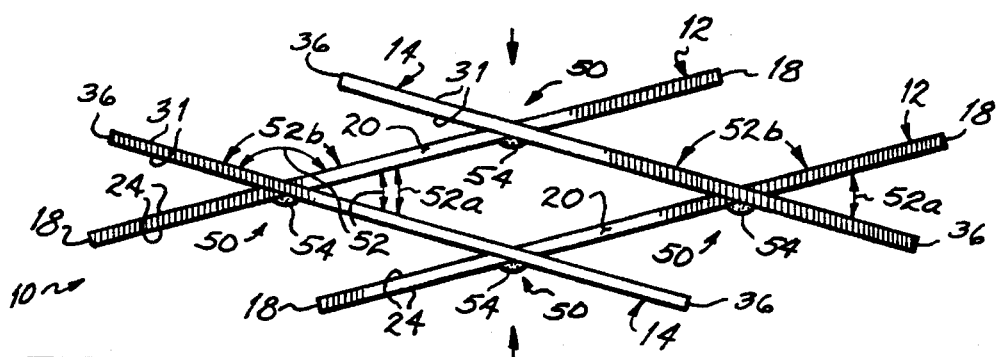
FIG. 5 is a top plan view of the partially collapsed partition assembly of FIG. 4.

Each slot 38 of a transverse divider 14 engages with one slot 16 of a longitudinal divider 12 and creates an intersection 50. The array shown in FIGS. 1 and 2 illustrates a total of four intersections sections 50, each divider, both longitudinal and transverse, having two evenly spaced slots. Each intersection 50 defines four angles 52, each angle 52 being defined by a side surface 24 of a longitudinal divider 12 and a side surface 31 of a transverse divider 14. When the assembly is in an erect or assembled position, the four angles 52 of each intersection are approximately 90° or right angles, as illustrated in FIG. 3. When the assembly 10 is in a collapsed position the angles 52 of each intersection 50 change such that two of the angles 52a are acute and two of the angles 52b are obtuse as shown in FIG. 5.

At each intersection 50 a linear securement bead 54 is placed along one angle 52. The securement bead 54 preferably is extruded into the angle so as to extend from adjacent a top edge 56 of the intersection 50 to adjacent a bottom edge 58 of the intersection 50. The linear securement bead may be made of one of several different materials such as a hot melt adhesive or a weldment of polyethylene or polypropylene.

An adhesive which has been found to be suitable for this application because it has the requisite adhesion properties when applied to high density polyethylene plastic as well as the requisite flexibility and recyclability is a one-component polyurethane hot melt moisture cure adhesive manufactured by H. B. Fuller Company of Palatine, Ill. and identified by their Product No. HL-9527. This particular hot melt adhesive is applied as a hot melt at extrusion temperatures no higher than 350° F. and cures in the presence of water or moisture to a tough, elastomeric film. Once cured, this adhesive has thermal and solvent resistance, good low temperature flexibility, excellent abrasion resistance, and high modulus/high impact strength. In order to completely cure this adhesive, it is recommended that the adhesive be exposed to temperatures and relative humidity conditions equal to or greater than 77° F. and 50% relative humidity.

In lieu of securing the plastic dividers in an assembled relationship by means of a linear bead 54 of adhesive, the intersecting partitions may be secured in an assembled relationship by means of a fillet weld of resinous material compatible with or substantially identical to the material of which the partitions or dividers 14 are manufactured. For example, if the dividers are made of polyethylene plastic, then the fillet weld applied to the intersection 50 will be of this same material—polyethylene. But if the dividers are made of polypropylene, then the fillet weld material will be of the same polypropylene. The appearance of the resulting assembled divider will be substantially identical to that depicted in FIGS. 1–5 except that the beads 54 of adhesive will be replaced by fillet welds of substantially the same configuration, but with the welding material being the same resinous plastic material as the material of which the partition or divider 12, 14 is made. In the application of such a weld, a heated tip is applied to the seam to be welded so as to pre-plasticize the welding surface of the thermoplastic dividers 12, 14. Molten plastic is then immediately injected under pressure into the weld area to fuse the injected molten plastic to the pre-plasticized, and still molten, plastic of the dividers so as to form a sound weld therebetween. The advantage of using the fillet welding technique to form the bead 54 is that there is no surface preparation necessary, and virtually no oxidation takes place during the welding process. Further the resulting assembled divider is easily recyclable since it contains only one plastic material. One suitable hand tool for use in connecting the dividers by such a fillet weld is manufactured and available from Drader of Edmonton, Alberta, Canada, and is identified as their "Injectiweld" welding system.

When the assembly 10 after having had the adhesive bead or weldment 54 applied thereto, is folded from its assembled state to a collapsed state each of the transverse dividers 14 rotates about the intersection axis 60 of each intersection 50 while each divider remains in a substantially planer configuration. The collapsed state of the assembly 10 enables the recipient of the box or container to remove the entire assembly 10 as an entity from the box or container, stack it for storage or return and repeatedly reuse it.

The principal advantage of the present invention over prior non-disassembling plastic divider partition assemblies is that it is very appreciably easier and less costly to manufacture and assemble than the prior non-disassembling plastic partition assemblies.

While I have described only a single preferred embodiment of my invention, I do not intend to be limited except by the scope of the following claims:

What is claimed is:

1. A collapsible partition assembly for dividing the space inside a container comprising:
   a set of parallel longitudinal dividers, each longitudinal divider having a series of spaced slots, each slot extending downwardly from a top edge of said longitudinal divider toward a bottom edge;
   a set of parallel transverse dividers, each transverse divider having a series of spaced slots, each slot extending upwardly from a bottom edge of said transverse divider toward a top edge;
   the slots of the transverse dividers being engaged with the slots of the longitudinal dividers so that each longitudinal divider intersects each transverse divider at an intersection;
   and the set of longitudinal dividers being flexibly and permanently affixed to the set of transverse dividers by a securement bead applied to at least one intersection.

2. The collapsible partition assembly of claim 1 wherein the securement bead is a moisture-cure, hot melt adhesive.

3. The collapsible partition assembly of claim 1 wherein the securement bead is substantially the same material as the dividers.

4. The collapsible partition assembly of claim 1 wherein each transverse divider is secured to a longitudinal divider by means of a fillet weld.

5. The collapsible partition assembly of claim 4 wherein said fillet weld is of resinous material substantially identical to the material of the dividers.

6. The collapsible partition assembly of claim 1 wherein each divider has spaced apart first and second side surfaces defining the depth of the divider, a top and bottom edge defining the height of the divider and two ends defining the width of the divider.

7. The collapsible partition assembly of claim 1 wherein each intersection defines four angles, each angle being defined by a side surface of a longitudinal divider and a side surface of a transverse divider, and each intersection having a securement bead along one angle.

8. The collapsible partition assembly of claim 7 wherein said securement bead is of material substantially identical to the material of which the dividers are made.

9. The collapsible partition assembly of claim 7 wherein said securement bead is a fillet weld of resinous material recyclably compatible with the material of which the dividers are made.

10. The collapsible partition assembly of claim 7 wherein said securement bead is a moisture-cure, hot-melt adhesive.

11. The collapsible partition assembly of claim 1 wherein said securement bead extends from adjacent a top edge of the intersection to adjacent a bottom edge of the intersection.

12. The collapsible partition assembly of claim 2 wherein the securement bead is sufficiently flexible to allow the transverse divider to pivot about an intersection axis.

13. The collapsible partition assembly of claim 1 wherein each transverse divider is capable of pivoting about an intersection axis of each intersection into a collapsed position.

14. The collapsible partition assembly of claim 13 wherein both longitudinal and transverse dividers remain relatively planar while the assembly is collapsed.

15. The collapsible partition assembly of claim 1 wherein both longitudinal and transverse dividers are manufactured from plastic materials.

16. The collapsible partition assembly of claim 15 wherein both longitudinal and transverse dividers are made of corrugated plastic materials.

17. The collapsible partition assembly of claim 15 wherein the plastic of the dividers and the material of the securement bead are sufficiently compatible that the entire assembly may be recycled without the securement bead having to be first removed from the plastic of the dividers.

18. The collapsible partition assembly of claim 1 wherein said securement bead is of a material which may be recycled with the material of the dividers.

19. The collapsible partition assembly of claim 1 wherein said securement bead is of a material which may be reused when the assembly is reused.

20. A collapsible partition assembly for dividing the internal space inside a container, the collapsible partition assembly having a longitudinal divider extending in one direction, said longitudinal divider having at least one slot, said slot extending downwardly from the top edge of said longitudinal divider to a point mid-way down said longitudinal divider and a transverse divider extending in a direction intersecting the longitudinal divider, said transverse divider having at least one slot, said slot extending upwardly from the bottom edge of said transverse divider to a point mid-way up said transverse divider, a slot of said longitudinal divider being engaged with a slot of said transverse divider at an intersection, and said longitudinal divider being flexibly and permanently affixed to said transverse divider at said intersection by a securement bead.

21. The collapsible partition assembly of claim 20 wherein said securement bead is a bead of adhesive.

22. The collapsible partition assembly of claim 20 wherein said securement bead is a bead of plastic.

23. The collapsible partition assembly of claim 22 wherein said bead of plastic is of substantially the same material as the material of the dividers.

24. The collapsible partition assembly of claim 21 wherein said adhesive is a moisture-cure, hot melt adhesive.

25. The collapsible partition assembly of claim 20 wherein said intersection defines four angles, each angle being defined by a side surface of said longitudinal divider and a side surface of said transverse divider.

26. The collapsible partition assembly of claim 25 wherein said intersection has a securement bead along one angle.

27. The collapsible partition assembly of claim 26 wherein said securement bead is a bead of adhesive.

28. The collapsible partition assembly of claim 27 wherein said securement bead is a bead of plastic.

29. The collapsible partition assembly of claim 28 wherein said plastic bead is of substantially the same material as the material of the dividers.

30. The collapsible partition assembly of claim 20 wherein said securement extends from one edge of the intersection at least part way to the other edge of the intersection.

31. The collapsible partition assembly of claim 20 wherein said securement bead extends for less than the full height of the intersection.

32. A method of assembling a collapsible partition assembly, said assembly having a plurality of longitudinal dividers and a plurality of transverse dividers, each longitudinal divider having a series of spaced slots extending downwardly from the top edge of the longitudinal divider to approximately the middle of the longitudinal divider, each transverse divider having a series of spaced parallel slots extending upwardly from the bottom edge of the transverse divider to approximately the middle of the transverse divider, each slot of a transverse divider being engaged with a slot of a longitudinal divider at an intersection, said intersection defining four angles said method comprising:
 a. arranging a plurality of longitudinal dividers in a spaced, relationship;
 b. engaging the slots of the transverse divider with the slots of the longitudinal dividers;
 c. applying a securement bead to at least one angle of an intersection of each longitudinal divider with a transverse divider.

33. A method of assembling a collapsible plastic partition assembly, said assembly having at least one plastic longitudinal divider and at least one plastic transverse divider, said longitudinal divider having a slot extending downwardly from the top edge of the longitudinal divider, the transverse divider having a slot extending upwardly from the bottom edge of the transverse divider, said method comprising:
 a. engaging the slot of the transverse divider with the slot of the longitudinal divider to create an intersection of the dividers, said intersection having four included angles; and
 b. applying a securement bead at the intersection along one angle to secure said dividers in an assembled collapsible relationship.

34. The method of assembling a collapsible plastic partition assembly of claim 33 wherein said securement bead is a bead of moisture-cure, hot melt adhesive.

35. The method of assembling a collapsible plastic partition assembly of claim 33 wherein said securement bead is a bead of plastic material substantially identical to the material of the dividers.

* * * * *